US008775062B2

(12) United States Patent
Becher et al.

(10) Patent No.: US 8,775,062 B2
(45) Date of Patent: Jul. 8, 2014

(54) TERMINAL AIRCRAFT SEQUENCING AND CONFLICT RESOLUTION

(75) Inventors: Thomas Alois Becher, McLean, VA (US); Eric Joseph Zakrzewski, Sterling, VA (US); Paul Vincent MacWilliams, Falls Church, VA (US)

(73) Assignee: The MITRE Corporation, McLean, VA (US)

( * ) Notice: Subject to any disclaimer, the term of this patent is extended or adjusted under 35 U.S.C. 154(b) by 78 days.

(21) Appl. No.: 13/287,833

(22) Filed: Nov. 2, 2011

(65) Prior Publication Data

US 2013/0110388 A1 May 2, 2013

(51) Int. Cl.
*G06F 19/00* (2011.01)
*G01S 13/00* (2006.01)

(52) U.S. Cl.
USPC ........................................ 701/120; 342/36

(58) Field of Classification Search
CPC ................................................ G08G 5/02
USPC .................................... 342/36; 701/120
See application file for complete search history.

(56) References Cited

U.S. PATENT DOCUMENTS

| | | | | |
|---|---|---|---|---|
| 4,706,198 | A | 11/1987 | Thurman | |
| 6,314,362 | B1 | 11/2001 | Erzberger et al. | |
| 6,393,358 | B1 | 5/2002 | Erzberger et al. | |
| 7,248,963 | B2 | 7/2007 | Baiada et al. | |
| 2004/0193362 | A1* | 9/2004 | Baiada et al. | 701/120 |
| 2011/0118981 | A1* | 5/2011 | Chamlou | 701/301 |
| 2012/0004837 | A1* | 1/2012 | McDonald | 701/120 |

OTHER PUBLICATIONS

Barker, D.R., et al., "Terminal Routing Using Speed-control Techniques (TRUST): Initial Concept Evaluation Report," *2nd USA/Europe Air Traffic Management R&D Seminar,* The MITRE Corporation, 23 pages, United States (Dec. 1998).

MacWilliams, P.V. and Zakrzewski, E., "Terminal Area Required Time of Arrival (RTA) Concept of Operations and Automation Prototype," *ICAS 2008, 26th International Congress of Aeronautical Science,* The MITRE Corporation, 20 pages, American Institute of Aeronautics and Astronautics (AIAA), United States (Sep. 2008).

Mohleji, S.C., Dr., "Route-Oriented Planning and Advisory Concepts for Terminal Automation," *MITRE-Sponsored Rearch,* PROJECT:95990, DEPT.: W-46 MTR-88W00223, 82 pages, The MITRE Corporation, United States (Jun. 1989).

(Continued)

*Primary Examiner* — Calvin Cheung
*Assistant Examiner* — Basil T Jos
(74) *Attorney, Agent, or Firm* — Sterne, Kessler, Goldstein & Fox P.L.L.C.

(57) ABSTRACT

Embodiments provide an advanced decision support tool to enable automated aircraft sequencing and conflict detection and resolution. The tool can be used to assist an air traffic controller (ATC) in determining merging, sequencing, and spacing resolutions; communicating the resolutions to the aircraft; and monitoring execution and compliance with the provided resolutions. According to embodiments, the tool can incorporate a broad range of inputs (e.g., surveillance data, weather information, aircraft equipage, etc.) and can be configured according to different aircraft sequencing modes of operation (e.g., one mode of operation is to minimize aircraft deviations necessary to resolve a particular conflict). In an embodiment, the tool includes a controller interface, which may be integrated within the controller interface of existing ATC systems or implemented separately. Embodiments can be implemented using software, hardware, or a combination thereof.

26 Claims, 8 Drawing Sheets

(56) References Cited

OTHER PUBLICATIONS

Robinson, J.F., et al., "A Concurrent Sequencing and Deconfliction Algorithm for Terminal Area Air Traffic Control," *American Institute of Aeronautics and Astronautics,* pp. 1-11, American Institute of Aeronautics and Astronautics, Inc., United States (2000).

"Speed and Route Advisor (SARA)," *The Knowledge and Development Centre Schipol* (*KDC*), 4 pages, KDC-Mainport, The Netherlands (www.kdc-mainport.nl), (2007).

* cited by examiner

TERMINAL AIRCRAFT SEQUENCING AND CONFLICT RESOLUTION

Statement under MPEP 310. The U.S. government has a paid-up license in this invention and the right in limited circumstances to require the patent owner to license others on reasonable terms as provided for by the terms of Contract No. 0210FB03-05, awarded by the Federal Aviation Agency (FAA).

FIELD OF THE INVENTION

The present invention relates generally to aircraft sequencing and conflict resolution.

BACKGROUND OF THE INVENTION

Air Navigation Service Providers (ANSPs) currently rely on manual (human-based) tasks for aircraft sequencing and conflict detection and resolution of aircraft flying arrival routes in the terminal area. The prediction of possible conflicts and any subsequent actions to resolve conflicts are left up to the air traffic controller. No automation currently exists to assist the air traffic controller during high demand periods while also addresssing all pertinent efficiency considerations.

Accordingly, there is a need for advanced decision support tools to enable automated aircraft sequencing and conflict detection and resolution.

BRIEF SUMMARY OF THE INVENTION

Embodiments of the present invention provide an advanced decision support tool to enable automated aircraft sequencing and conflict detection and resolution. The tool can be used to assist Air Traffic Control (ATC) in determining merging, sequencing, and spacing resolutions; communicating the resolutions to the aircraft; and monitoring execution and compliance with the provided resolutions. According to embodiments, the tool can incorporate a broad range of inputs (e.g., surveillance data, weather information, aircraft equipage, etc.) and can be configured according to different aircraft sequencing modes of operation (e.g., one mode of operation is to minimize aircraft deviations necessary to resolve a particular conflict) and site-defined preferences. In an embodiment, the tool includes a controller interface, which may be integrated within the controller display of existing ATC systems or implemented separately. Embodiments can be implemented using software, hardware, or a combination therof.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

Overview

Evaluating and managing complex aircraft arrival flows in the terminal area is a cognitively demanding task. Typically, Terminal Radar Approach Control Facility (TRACON) controllers have to resolve sequencing issues due to route airspace constraints, wind, varying aircraft performance, and speed differentials. Further, in most terminal areas, there are several different flows of aircraft, arriving to the same runway, which must be merged into a single flow. As a result, significant controller workload is required during busying arrival operations.

ANSPs currently rely on manual (human-based) tasks for aircraft sequencing and conflict detection and resolution of aircraft flying arrival routes in the terminal area. The prediction of possible conflicts and any subsequent actions to resolve conflicts are left up to the air traffic controller. No automation currently exists to assist the air traffic controller during high demand periods while also addresssing all pertinent efficiency considerations.

Embodiments of the present invention provide an advanced decision support tool to enable automated aircraft sequencing and conflict detection and resolution. The tool can be used to assist ATC in determining merging, sequencing, and spacing resolutions; communicating the resolutions to the aircraft; and monitoring execution and compliance with the provided resolutions. According to embodiments, the tool can incorporate a broad range of inputs (e.g., surveillance data, weather information, aircraft equipage, etc.) and can be configured according to different aircraft sequencing modes of operation (e.g., one mode of operation is to minimize aircraft deviations necessary to resolve a particular conflict) and site-defined preferences. In an embodiment, the tool includes a controller interface, which may be integrated within the controller display of existing ATC systems or implemented separately. Embodiments can be implemented using software, hardware, or a combination thereof.

Example System Embodiments

Figure 1:
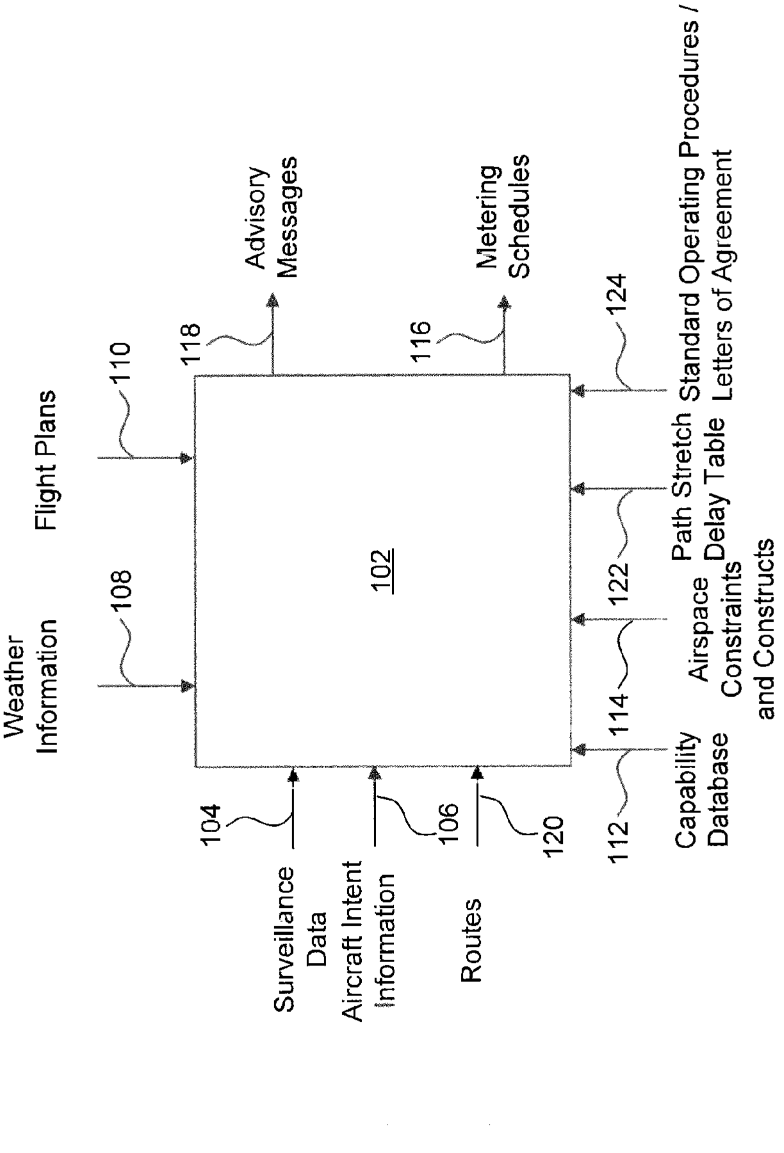
FIG. 1 is a block diagram of an example system for terminal aircraft sequencing and conflict resolution according to an embodiment of the present invention.

FIG. 1 is a block diagram 100 of an example system 102 for terminal aircraft sequencing and conflict resolution according to an embodiment of the present invention. Example system 102 can be implemented in software, hardware, or a combination thereof. Example system 102 may implement a variety of methods, computational algorithms, and heuristics, further described below, according to embodiments of the present invention.

As shown in FIG. 1, example system 102 receives a plurality of inputs, including surveillance data 104, aircraft intent information 106, weather information 108, flight plans 110, aircraft capability database information 112, airspace constraints and constructs 114, routes 120, a path stretch delay table 122, and Standard Operating Procedures (SOPs) and Letters of Agreement (LOAs) 124. Example system 102 generates and outputs metering schedules 116 and advisory messages 118. In an embodiment, metering schedules 116 and advisory messages 118 are displayed graphically using a graphical interface (not shown in FIG. 1).

According to embodiments, surveillance data 104 includes aircraft state information (e.g., latitude, longitude, altitude, ground speed) of aircraft in the airspace monitored by system 102. Surveillance data 104 can be obtained, for example, from the TRACON and/or other radar sources.

Aircraft intent information 106 includes Estimated Times of Arrival (ETAs), Required Time of Arrival windows, and forecast winds at a sequence of points along the route that the aircraft intends to fly. Additionally, cost index (the tradeoff between fuel and time), aircraft weight, Top of Climb (TOC), Top of Descent (TOD) and sensed winds are provided in the intent information. Other information could also be provided through this mechanism, such as Flight Management System (FMS) predicted speed and altitude profiles. Aircraft intent information 106 can be obtained from the aircraft. In an embodiment, aircraft intent information 106 is received by system 102, via a direct communication link, from the aircraft's FMS. As such, system 102 may include an appropriate receiver for communicating with the aircraft's FMS and for receiving aircraft intent information 106 directly from the aircraft via the direct communication link.

Weather information 108 includes various environmental data of relevance to terminal aircraft sequencing and conflict resolution. For example, weather information 108 may include data about wind conditions (e.g., wind direction and speed at different altitudes). Weather information 108 can also be augmented by information provided through aircraft intent information 106 (e.g., forecast or sensed winds, temperature, and pressure). In an embodiment, wind conditions are accounted for to determine accurate aircraft trajectory predictions and issued advisories.

Flight plans 110 include, for example, filed routes to be used by aircraft as well as aircraft equipage. Flight plans 110 can be obtained from existing ATC systems. In an embodiment, flight plans 110 are accounted for in system 102 by ensuring that aircraft plans and capabilities are modeled appropriately.

Aircraft capability database information 112 includes information regarding aircraft type and crew training, including information regarding flight deck capabilities. This may include, for example, information regarding the aircraft's ability (or inability) to execute RNAV, Required Navigation Performance (RNP), Required Time of Arrival (RTA) procedures, and/or path stretching maneuvers. In an embodiment, information 112 is obtained from an aircraft capability database.

Airspace constraints and constructs 114 include airspace and/or topological information that could constrain aircraft sequencing and conflict resolution decisions. For example, airspace constraints and constructs 114 may include information regarding forbidden areas of the monitored airspace and/or information regarding physical ground obstacles in the surrounding area.

Routes 120 include published RNAV/RNP procedures, conventional procedures, site adapted routes, and downlinked routes. In an embodiment, routes are used for trajectory and time calculations.

Path stretch delay table 122 defines time control achievable by various path stretching methods (path stretching increases distance of flight by methods including Lateral Offset (LO) and Path-Bearing-Distance (PBD) which are lateral deviations from the present course that later rejoin) and parameters considering potential weather conditions. In an embodiment, the path stretch delay table is used to determine the appropriate time control advisory given a necessary delay.

Standard Operating Procedures (SOPs) and Letters of Agreement (LOAs) 124 include typical and allowable maneuvering areas, minimum time separations, airspace boundaries, noise constrained areas, and delivery speeds and altitudes. In an embodiment, SOPs and LOAs 124 inform system 102 in providing necessary and appropriate control of aircraft.

Using one or more of the above described inputs 104, 106, 108, 110, 112, 114, 120, 122, and 124, system 102 generates and outputs metering schedules 116. Metering schedules 116 include scheduled times of arrival of aircraft being monitored by system 102, at one or more specified common points. In an embodiment, the scheduled times of arrival are optimized based on one or more of inputs 104, 106, 108, 110, 112, 114, 120, 122, and 124, and ensure conflict-free metering/sequencing schedules. Metering schedules 116 are generated and updated dynamically in real time. For example, system 102 generates and outputs metering schedules 116 periodically at specified time intervals based on real time inputs. In an embodiment, system 102 includes a graphical interface (such as controller interface 602 described below in FIG. 6) for displaying metering schedules 116 to an ATC system (e.g., ATC system 606 described below in FIG. 6).

Based on metering schedules 116 and using one or more of inputs 104, 106, 108, 110, 112, and 114, system 102 generates and outputs advisory messages 118 to ensure that aircraft actual times of arrival at the one or more specified common points comply with (or are within an allowable tolerance of) metering schedules 116. In an embodiment, system 102 includes logic for real time processing one or more of inputs 104, 106, 108, 110, 112, 114, 120, 122, and 124 and for detecting actual or potential violations of metering schedules 116. In an embodiment, the logic checks for actual or potential violations of specified minimum time separations between aircraft at the one or more specified common points; and, if actual or potential violations are detected, generates advisory messages 118 to prevent the occurrence of such violations.

Advisory messages 118 include time control commands and/or manual intervention commands. Time control commands can be of various types, including, but not limited to, speed control commands, RTA commands, and path stretch commands. Path stretch commands can be of various types, including, but not limited to, LO and PBD commands. According to embodiments, system 102 includes logic for determining the most appropriate advisory message to issue based on preferences and aircraft capabilities. For example, if the advisory message with the highest preference level cannot be executed based on the particular conditions, the advisory message with the next highest preference level that can be executed is issued. In an embodiment, the logic determines one or more advisories, and displays them to the controller interface 602.

In an embodiment, the logic considers one or more of surveillance data 104, weather information 108, aircraft capability database information 112, routes 120, path stretch delay table 122, SOPs/LOAs 124, and airspace constraints and constructs 114 in determining the most appropriate advisory message to issue. Particularly, aircraft capability database information 112 for the particular aircraft being issued the advisory message governs the type of the advisory message. Other parameters associated with the advisory message may also be affected by information from the capability database 112, as well as other inputs of system 102.

According to embodiments, advisory messages 118 are time-based, i.e., include associated times for delivery to the aircraft (e.g., by voice or datalink communication by ATC) and for execution by the aircraft. In an embodiment, advisory messages 118 are delivered directly to the aircraft (ATC may be given an option to approve, augment, or cancel delivery) using a direct communication link with the aircraft's FMS when available.

Figure 2:
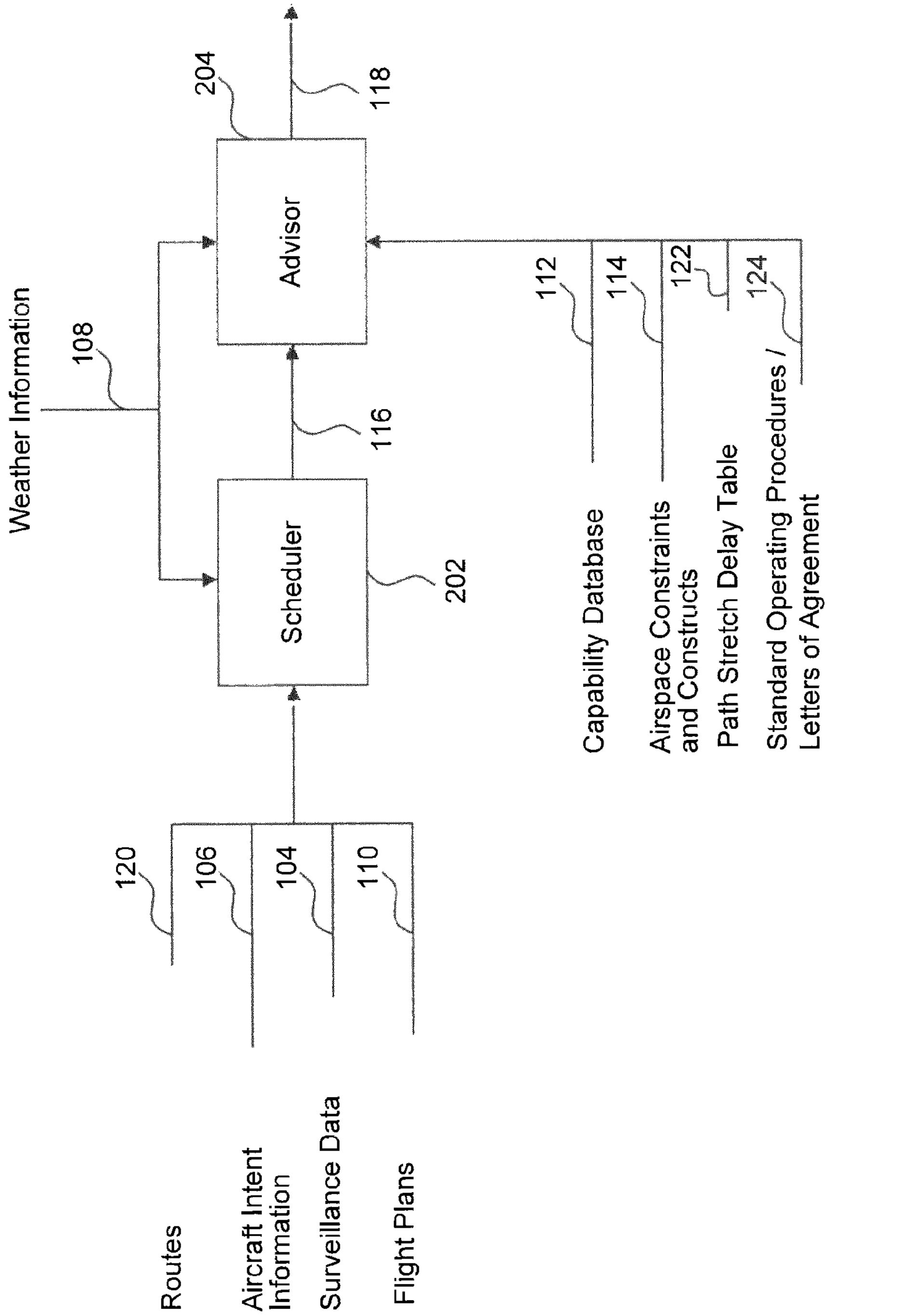
FIG. 2 is a block diagram of another example system for terminal aircraft sequencing and conflict resolution according to an embodiment of the present invention.

FIG. 2 is a block diagram of another example system 200 for terminal aircraft sequencing and conflict resolution according to an embodiment of the present invention. As shown in FIG. 2, example system 200 includes a scheduler module 202 and an advisor module 204.

Scheduler module 202 receives a plurality of inputs, including routes 120, aircraft intent information 106, surveillance data 104, flight plans 110, and weather information 108. Based on the received inputs, scheduler module 202 generates and outputs metering schedules 116 to advisor module 204. In an embodiment, scheduler module 202 includes similar logic as described above with reference to example system 102, in order to generate and output metering schedules 116.

Advisor module 204 receives a plurality of inputs, including metering schedules 116 from scheduler module 202, weather information 108, aircraft capability database information 112, airspace constructs and constraints 114, SOPs and LOAs 124, and a path stretch delay table 122. Based on the received inputs, advisor module 204 generates and outputs advisory messages 118. In an embodiment, advisor module 204 includes similar logic as described above with reference to example system 102, in order to generate and output advisory messages 118.

Like example system 102, example system 200 may also include a graphical interface (not shown in FIG. 2) for displaying metering schedules 116 and advisory messages 118 to ATC.

Example Method Embodiments

Example methods according to embodiments of the present invention will now be provided for the purpose of illustration. These example methods may be performed by the example system embodiments described above, and can be implemented using software, hardware, or a combination thereof.

Figure 3:
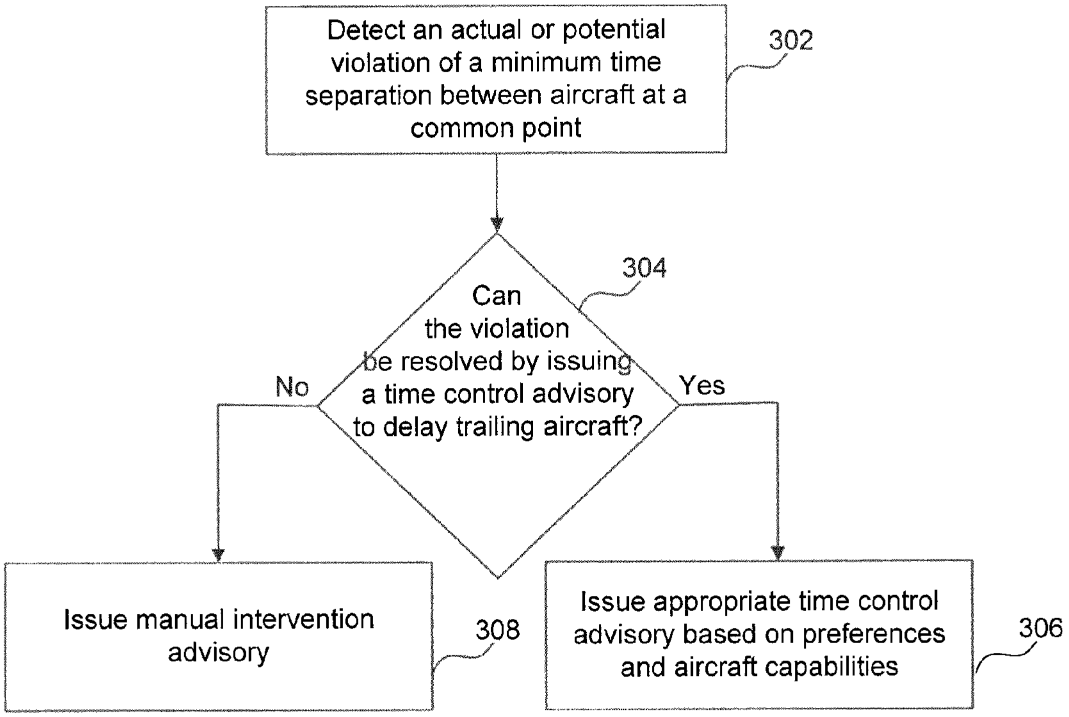
FIG. 3 is a process flowchart of a method for aircraft conflict resolution according to an embodiment of the present invention.

FIG. 3 is a process flowchart 300 of a method for aircraft conflict resolution according to an embodiment of the present invention.

As shown in FIG. 3, process 300 begins in step 302, which includes detecting an actual or potential violation of a minimum time separation between aircraft at a common point. In an embodiment, step 302 includes comparing an actual/potential time separation between the aircraft at the common point, computed based on surveillance data and/or aircraft intent information with the minimum time separation; and detecting an actual/potential violation if the actual/potential time separation is less than the minimum time separation.

Process 300 continues at step 304, which includes determining if the actual/potential violation can be resolved by issuing the trailing aircraft a time control advisory based on capabilities of the trailing aircraft. In an embodiment, step 304 includes determining if a delay required to resolve the actual/potential violation is within a time-control window of the trailing aircraft. The time control window is a time window bounded by the earliest and latest estimated arrival times of the aircraft at a common point.

If the actual/potential violation can be resolved by issuing a time control advisory, process 300 proceeds to step 306, which includes issuing an advisory message for appropriate time control to the trailing aircraft with respect to the common point. The time control advisory is based on preferences and aircraft capabilities. Otherwise, process 300 proceeds to step 308, which includes issuing a manual intervention advisory message to ATC. The manual intervention advisory message includes a scheduled delivery time at a common point.

Figure 4:
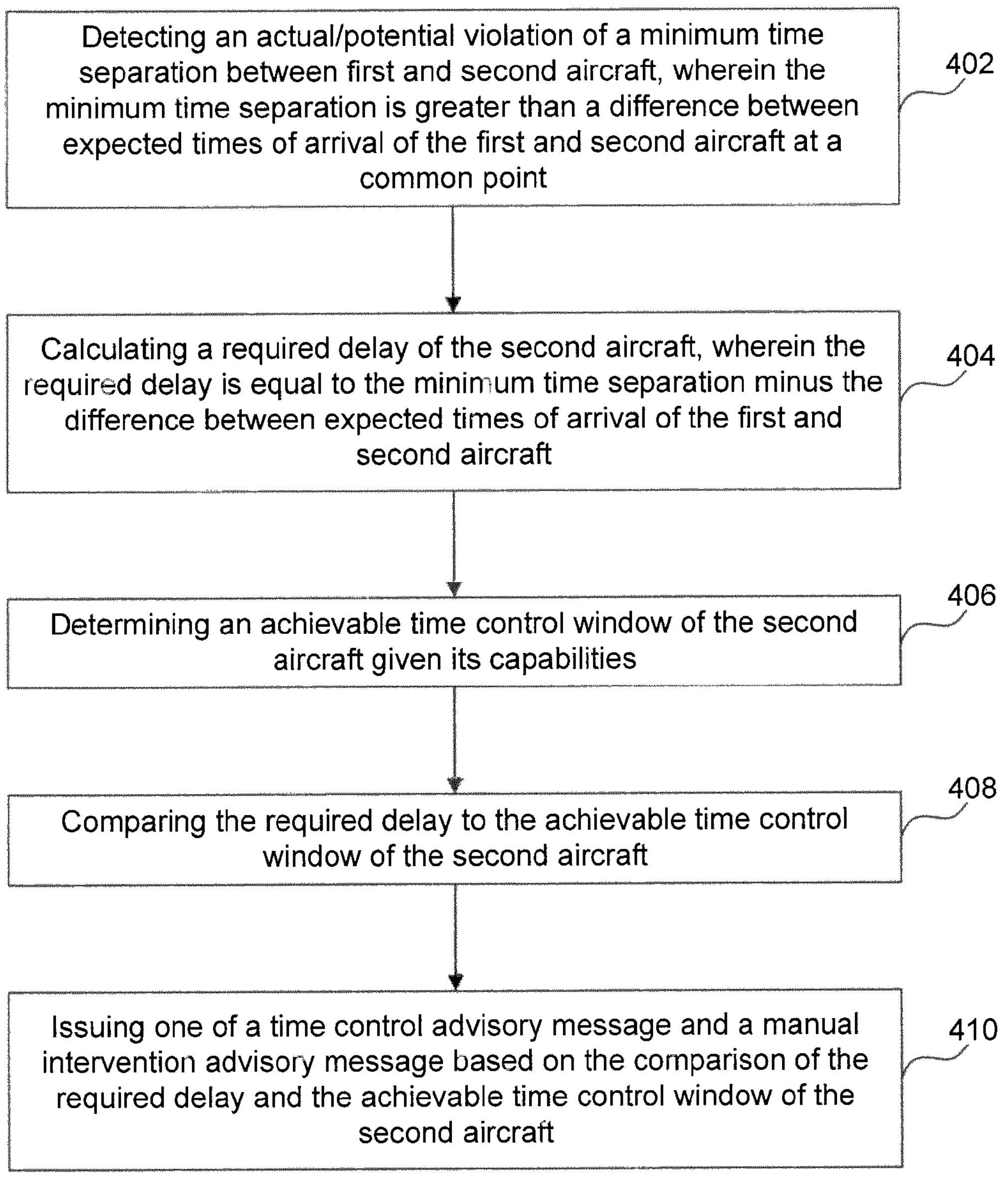
FIG. 4 is another process flowchart of a method for aircraft conflict resolution according to an embodiment of the present invention.

FIG. 4 is another process flowchart 400 of a method for aircraft conflict resolution according to an embodiment of the present invention.

As shown in FIG. 4, process 400 begins in step 402, which includes detecting an actual/potential violation of a minimum time separation between first and second aircraft. In an embodiment, step 402 includes detecting that the minimum time separation is greater than a difference between expected times of arrival of the first and second aircraft at a common point.

Process 400 continues at step 404, which includes calculating a required delay of the second aircraft (assuming that the second aircraft is the trailing aircraft). In an embodiment, the required delay is equal to the minimum time separation minus the difference between the expected times of arrival of the first and second aircraft at the common point.

Subsequently, at step 406, process 400 includes determining an achievable time control window of the second aircraft. In an embodiment, the achievable time control window is determined based on capabilities of the second aircraft, and is bounded by the earliest and latest estimated arrival times of the second aircraft at the common point.

Then, at step 408, process 400 includes comparing the required delay of the second aircraft to the achievable time control window of the second aircraft.

Finally, at step 410, process 400 includes issuing either a time control advisory message or a manual controller intervention advisory message based on the comparison of the required delay and the achievable time control window of the second aircraft.

Figure 5:
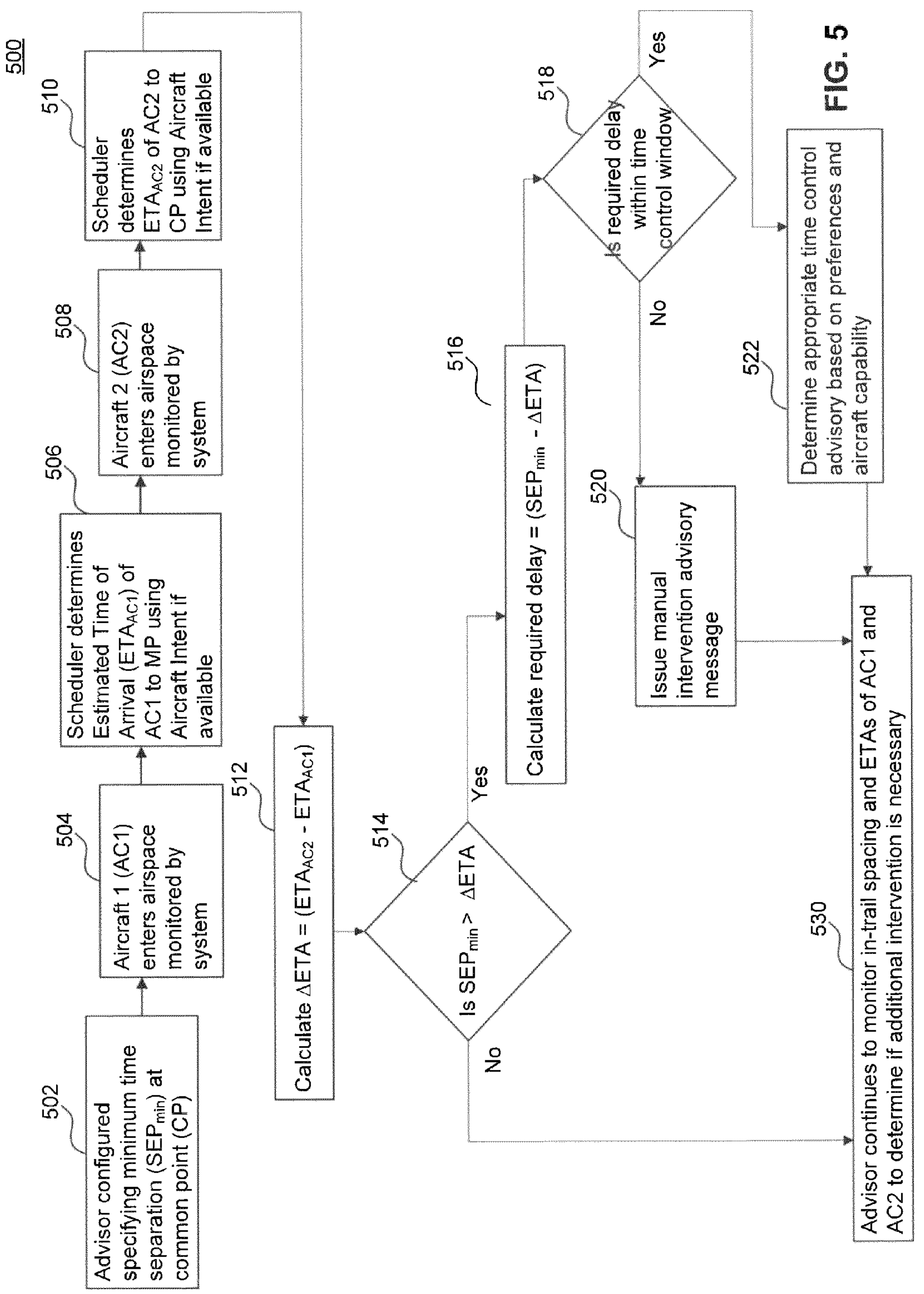
FIG. 5 is another process flowchart of a method for aircraft conflict resolution according to an embodiment of the present invention.

FIG. 5 is another process flowchart 500 of a method for aircraft conflict resolution according to an embodiment of the present invention. Process 500 may be performed, for example, by scheduler module 202 and advisor module 204, described above with reference to FIG. 2.

As shown in FIG. 5, process 500 begins at step 502, which includes configuring advisor module 204 by specifying a minimum time separation ($SEP_{min}$) at a common point.

At step 504, a first aircraft (AC1) enters the airspace being monitored by the system.

At step 506, scheduler module 202 determines an estimated time of arrival of the first aircraft ($ETA_{AC1}$) at the common point. In an embodiment, the estimated time of arrival of the first aircraft is calculated using aircraft intent information if available.

At step 508, a second aircraft (AC2) enters the airspace being monitored by the system.

At step 510, scheduler module 202 determines an estimated time of arrival of the second aircraft ($ETA_{AC2}$) at the common point. In an embodiment, the estimated time of arrival of the second aircraft is calculated using aircraft intent information if available. If $ETA_{AC2}$ is prior to $ETA_{AC1}$ then the scheduler reorders the first and second aircraft.

Subsequently, at step 512, advisor module 204 calculates a difference between the estimated times of arrival of the second and first aircraft ($\Delta ETA = ETA_{AC2} - ETA_{AC1}$).

At step 514, advisor module 204 compares the difference to the minimum time separation $SEP_{min}$.

If the minimum time separation $SEP_{min}$ is less than or equal to the difference between the estimated times of arrival of the second and first aircraft (ΔETA), then no action is required and process 500 proceeds to step 530, in which advisor module 204 continues to monitor in-trail spacing and ETAs of the first and second aircraft to determine if additional intervention is necessary.

Otherwise, if the minimum time separation $SEP_{min}$ is greater than ΔETA, then at step 516, advisor module 204 calculates a required delay equal to the difference between the minimum time separation $SEP_{min}$ and ΔETA.

Subsequently, at step 518, advisor module 204 compares the required delay to the achievable time control window of the second aircraft.

If the required delay is greater than the achievable time control window of the second aircraft, then at step 520, advisor module 204 issues a manual intervention advisory.

If the delay is within the achievable time control window of the second aircraft, then at step 522, advisor module 204 issues the appropriate time control advisories based on preferences and aircraft capabilities.

After the conflict is resolved using any of steps 520 or 522 process 500 proceeds to step 530 in which, as described above, advisor module 204 continues to monitor in-trail spacing and ETAs of the first and second aircraft to determine if additional intervention is necessary.

Controller Interface Implementation

Figure 6:
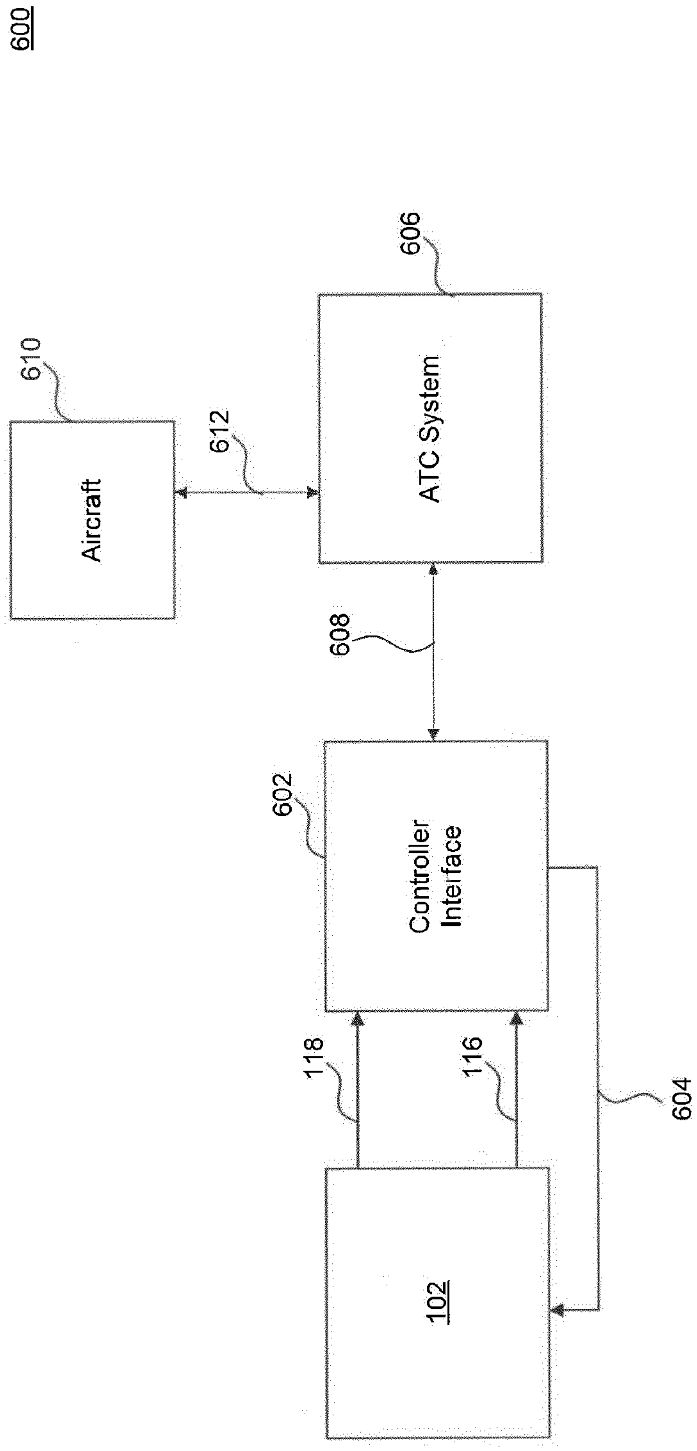
FIG. 6 illustrates an example system for terminal aircraft sequencing and conflict resolution according to an embodiment of the present invention.

As described above, system embodiments may include a graphical controller interface for displaying metering schedules and advisory messages to ATC. FIG. 6 is a block diagram that illustrates the integration of a controller interface 602 with example system 102, described above with reference to FIG. 1.

As shown in FIG. 6, controller interface 602 receives metering schedules 116 and advisory messages 118 from system 102. Controller interface 602 displays the received metering schedules 116 and advisory messages 118 to the ATC system 606.

In addition, controller interface 602 may interact with system 102 using a communications interface 604. As such, controller interface 602 may be used by ATC system 606 to configure and interact with system 102. In an embodiment, controller interface 602 may be used by ATC system 606 to configure system 102 to operate according to various aircraft sequencing modes of operation.

As shown in FIG. 6, ATC system 606 may also interact with controller interface 602 using a communications interface 608. ATC system 606 may also interact directly with an aircraft 610 using existing communication interfaces 612.

Accounting for Aircraft Compression

Figure 7:
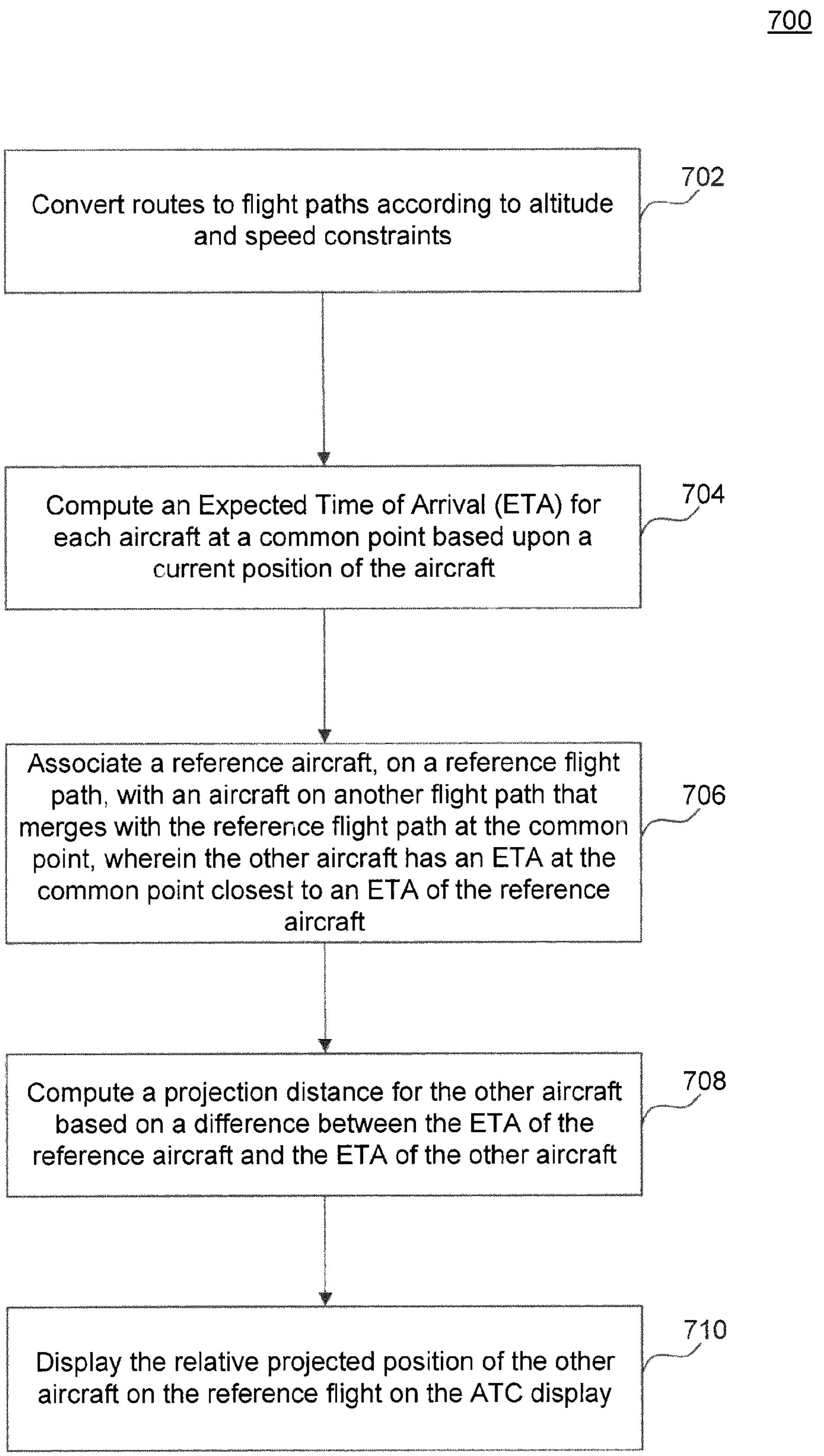
FIG. 7 is a process flowchart of a method for calculating aircraft position according to an embodiment of the present invention.

FIG. 7 is a process flowchart 700 of a method for calculating aircraft position in which aircraft compression is accounted for, according to an embodiment of the present invention. The method of FIG. 7 provides an aircraft specific means for accounting for aircraft compression, which may be due to slowing down in the terminal area as aircraft are sequenced and spaced for landing. Statistical methods are applied to historical operations to determine the parameters needed for a trajectory model that enables accurate enough time prediction to a terminal merge location soon enough, that conversion of the predicted position of an aircraft is of value to the Air Traffic controller for manipulating aircraft while keeping aircraft on their predefined arrival paths or routes.

As shown in FIG. 7, process 700 begins in step 702, which includes converting routes to flight paths according to altitude and speed constraints. In an embodiment, step 702 further accounts for line and circular arc path geometries. In an embodiment, step 702 further includes receiving routes (which include published RNAV/RNP procedures, conventional procedures, site adapted routes, and downlinked routes), historical surveillance data, and/or aircraft specific performance parameters derived from historical surveillance data. In an embodiment, aircraft specific performance parameters are updated on a continuous basis, after a baseline of parameters is established for a particular airport. For example, the parameters are monitored for quality of performance, and updated based on factors such as aircraft type, weather, and airport demand distribution.

Process 700 continues at step 704, which includes computing an Estimated Time of Arrival (ETA) for each aircraft at a common point based upon a current position of the aircraft. In an embodiment, step 704 is performed using specific adapted algorithms, which can be, for example, based upon a constant acceleration model that is aircraft specific and utilizes predicted ground speed derived from historical surveillance data. Where appropriate, speed and altitude parameters in the model are obtained from the flight procedure and included in the ETA calculation. In an embodiment, the current position and speed of the aircraft received from a radar surveillance system would further inform this calculation to allow for an updated estimation of ETA with each radar surveillance update.

Subsequently, at step 706, process 700 includes associating a reference aircraft, on a reference flight path, with another aircraft on another flight path that merges with the reference flight path at the common point, wherein the other aircraft has the closest ETA at the common point (among all other aircraft on the other flight path) to the ETA of the reference aircraft. In an embodiment, step 706 includes comparing the ETA of the reference aircraft with the ETA of every aircraft on the other flight path, and selecting the aircraft with the closest ETA. In an embodiment, step 706 is repeated at every surveillance cycle and compared to predicted values.

Then, at step 708, process 700 includes computing a projection distance for the other aircraft based on a difference between the ETA of the reference aircraft and the ETA of the other aircraft. The projection distance represents a distance from the common point on the reference flight path. In an embodiment, the projection method includes computing the projection distance and then applying the projection distance by accounting for turns. The distance of turn anticipation is computed based upon ground speed and bank associated with each aircraft type derived from historical radar track data. In an embodiment, the projection calculation distance of the reference aircraft is given by $d_p = d_1(ETA_2 - ETA_1)/ETA_1 + d_2$ where $d_2$ is the distance of the other aircraft on the other flight path from the common point (that is closest in ETA with the reference aircraft) and $d_1$ is the distance of the reference aircraft from the common point. In an embodiment, the computation would be done during each radar sweep. The ETA values are smoothed to preserve acceptable behavior by an ATC system, minimizing non-physical behavior of the projection.

Finally, in step 710, process 700 includes displaying the relative projected position of the other aircraft on the reference flight path line, thereby providing the ATC with a visualization of aircraft relative position to each other.

Example Computer System Implementation

Figure 8:
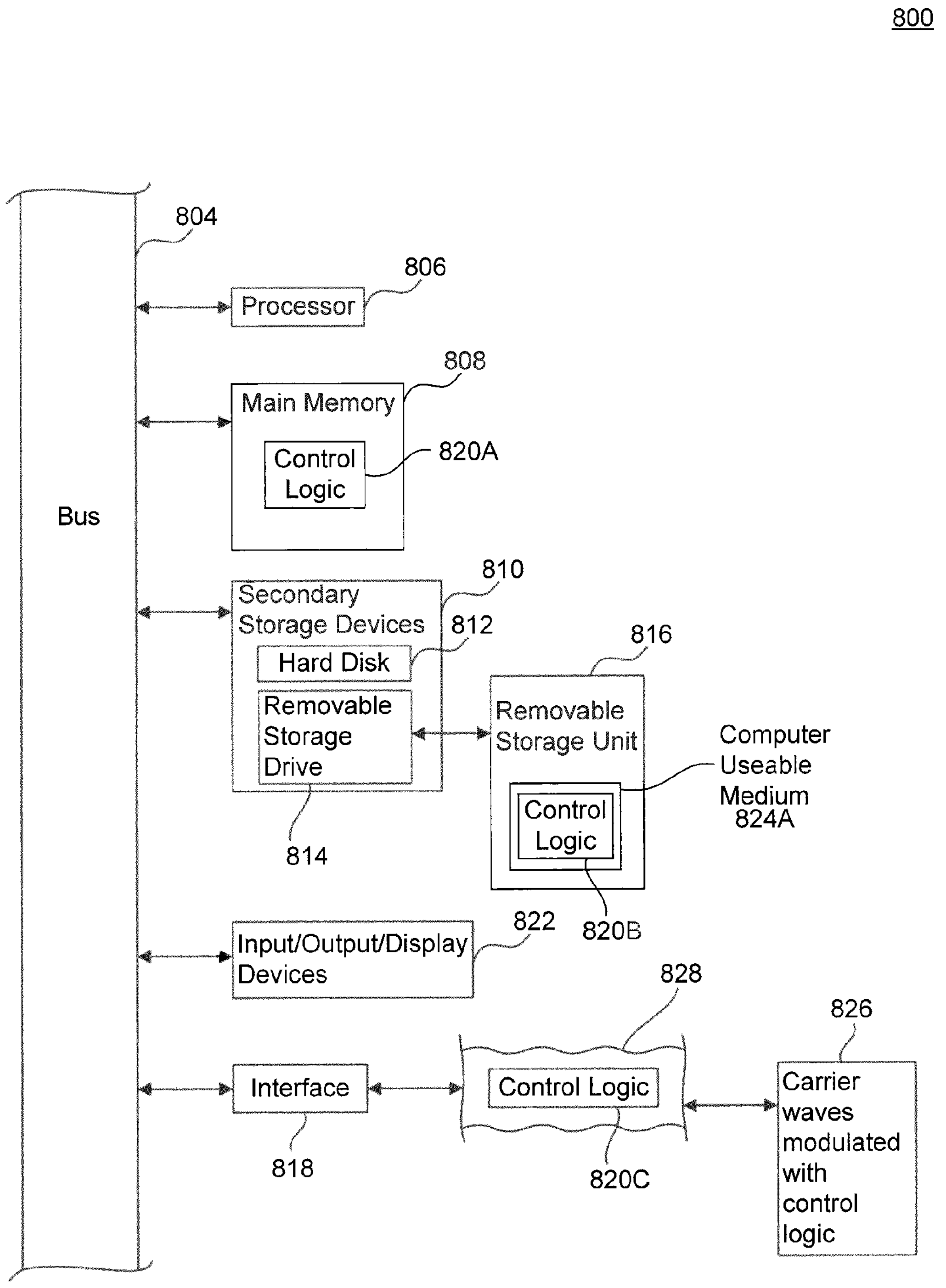
FIG. 8 is an example computer system capable of implementing embodiments of the present invention.

Various aspects of embodiments the present invention can be implemented using software, hardware, or a combination thereof. FIG. 8 illustrates an example computer system 800 in which embodiments of the present invention, or portions thereof, can be implemented as computer-readable code. For example, the methods illustrated by process flowcharts 300, 400, and 500 can be implemented in system 800. However, after reading this description, it will become apparent to a person skilled in the relevant art how to implement embodiments using other computer systems and/or computer architectures.

Computer system 800 includes one or more processors, such as processor 806. Processor 806 can be a special purpose or a general purpose processor. Processor 806 is connected to a communication infrastructure 804 (for example, a bus or network).

Computer system 800 also includes a main memory 808 (e.g., random access memory (RAM)) and secondary storage devices 810. Secondary storage 810 may include, for example, a hard disk drive 812, a removable storage drive 814, and/or a memory stick. Removable storage drive 814 may comprise a floppy disk drive, a magnetic tape drive, an optical disk drive, a flash memory, or the like. Removable storage drive 814 reads from and/or writes to a removable storage unit 816 in a well known manner. Removable storage unit 816 may comprise a floppy disk, magnetic tape, optical disk, etc. which is read by and written to by removable storage drive 814. As will be appreciated by persons skilled in the relevant art(s), removable storage unit 816 includes a computer usable storage medium 824A having stored therein computer software and/or logic 820B.

Computer system 800 may also include a communications interface 818. Communications interface 818 allows software and data to be transferred between computer system 800 and external devices. Communications interface 818 may include a modem, a network interface (such as an Ethernet card), a communications port, a PCMCIA slot and card, or the like. Software and data transferred via communications interface 818 are in the form of signals which may be electronic, electromagnetic, optical, or other signals capable of being received by communications interface 818. These signals are provided to communications interface 918 via a communications path 828. Communications path 828 carries signals and may be implemented using wire or cable, fiber optics, a phone line, a cellular phone link, an RF link or other communications channels.

In this document, the terms "computer usable medium" and "computer readable medium" are used to generally refer to media such as removable storage unit 816 and a hard disk installed in hard disk drive 812. Computer usable medium can also refer to memories, such as main memory 808 and secondary storage devices 810, which can be memory semiconductors (e.g. DRAMs, etc.).

Computer programs (also called computer control logic) are stored in main memory 808 and/or secondary storage devices 810. Computer programs may also be received via communications interface 818. Such computer programs, when executed, enable computer system 800 to implement embodiments of the present invention as discussed herein. In particular, the computer programs, when executed, enable processor 806 to implement the processes of the present invention. Where embodiments are implemented using software, the software may be stored in a computer program product and loaded into computer system 800 using removable storage drive 814, interface 818, or hard drive 812.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for terminal aircraft sequencing and conflict resolution, comprising:

detecting, by a terminal aircraft sequencing system, an actual or potential violation of a minimum time separation between first and second aircraft, wherein the minimum time separation is greater than a difference between an estimated time of arrival (ETA) of the second aircraft and an ETA of the first aircraft at a common point;

calculating, by the terminal aircraft sequencing system, a required delay of the second aircraft, wherein the required delay is equal to the minimum time separation minus the difference between the estimated times of arrival of the first and second aircraft;

determining, by the terminal aircraft sequencing system, an achievable time control window of the second aircraft, wherein determining the achievable time control window comprises determining an earliest ETA and a latest ETA achievable by the second aircraft at the common point without modifying a lateral path of flight of the second aircraft;

comparing, by the terminal aircraft sequencing system, the required delay to the achievable time control window of the second aircraft; and issuing, by the terminal aircraft sequencing system, one of a speed control advisory message, a lateral offset advisory message, and a manual controller intervention advisory message based on the comparison of the required delay and the achievable time control window of the second aircraft.

2. The method of claim 1, further comprising:

determining the ETA of the first aircraft and the ETA of the second aircraft using aircraft intent information.

3. The method of claim 1, wherein determining the achievable time control window comprises determining the achievable time control window based on a defined required time of arrival (RTA) of the second aircraft.

4. The method of claim 1, further comprising:

if the required delay is greater than the achievable time control window of the second aircraft, determining if the second aircraft is capable of performing lateral offset maneuvers.

5. The method of claim 4, further comprising:

if the second aircraft is capable of performing lateral offset maneuvers, issuing the lateral offset advisory message to the second aircraft, the lateral offset advisory message including a time of arrival of the second aircraft at the common point equal to the ETA of the first aircraft plus the minimum time separation; and if the second aircraft is not capable of performing lateral offset maneuvers, issuing the manual controller intervention advisory message, the manual controller intervention advisory message advising manual intervention by an air traffic controller to resolve the detected actual or potential violation.

6. The method of claim 5, further comprising:

determining a magnitude of a lateral offset specified in the lateral offset advisory message based on the required delay using a look up table.

7. The method of claim 6, wherein the lookup table includes as path stretch delay table configured to provide achievable time control windows using a plurality of path stretching methods based on the required delay and weather conditions.

8. The method of claim 1, further comprising:

if the required delay is less than the achievable time control window, determining if the second aircraft is capable of performing Required Time of Arrival (RTA) commands.

9. The method of claim 8, further comprising:

if the second aircraft is capable of performing RTA commands, issuing the speed control advisory message in the form of an RTA command, the RTA command specifying a time of arrival of the second aircraft at the common point equal to the ETA of the first aircraft plus the minimum time separation; and if the second aircraft is not capable of performing RTA commands, issuing the speed control advisory message in the form of a timed speed command, the timed speed command including a speed clearance and an issuance time for an air traffic controller to issue the command to the second aircraft.

10. The method of claim 1, wherein detecting the actual or potential violation of the minimum time separation between the first and second aircraft comprises:

calculating a relative projected position of the second aircraft on a first flight path of the first aircraft, by accounting fir aircraft compression.

11. The method of claim 10, further comprising:

computing the ETA of the first aircraft and the ETA of the second aircraft at the common point;

associating the first aircraft with the second aircraft, wherein a second flight path of the second aircraft merges with the first flight path of the first aircraft at the common point, and wherein the ETA of the second aircraft at the common point is the closest ETA to the ETA of the first aircraft at the common point, among all aircraft on the second flight path; and computing a projection distance for the second aircraft based on the difference between the ETA of the second aircraft and the ETA of the first aircraft at the common point.

12. A system for terminal aircraft sequencing and conflict resolution, comprising:

a processor configured to execute a scheduler module and an advisor module, the scheduler module configured to receive one or more of aircraft intent information, surveillance data, published flight procedures, weather information, and Area Navigation (RNAV)/Required Navigation Performance (RNP) routes and to generate a metering schedule at a common point; and the advisor module configured to receive the metering schedule from the scheduler module and the weather information, aircraft equipage information, airspace constraints and constructs, standard operating procedures, and a lateral offset delay table and to issue an advisory message upon detecting actual or potential violations of the metering schedule by an aircraft; and a controller interface configured to display the metering schedule and the advisory message for viewing by an air traffic controller.

13. The system of claim 12, wherein the scheduler module is configured to generate and update the metering schedule in real time.

14. The system of claim 12, wherein the advisor module is further configured to determine one or more advisory messages with associated preference levels, and wherein the advisory message issued is the message with the highest preference level.

15. The system of claim 12, wherein the advisor module is further configured to issue the advisory message based on aircraft capabilities of the aircraft.

16. The system of claim 12, wherein the advisory message is one of a speed control advisory message, a lateral offset advisory message, and a manual controller intervention advisory message.

17. The system of claim 12, wherein the controller interface is operable to configure the advisor module to operate according to a selected aircraft sequencing mode of operation.

18. A computer program product comprising a non-transitory computer readable medium including control logic stored therein, the control logic when executed by one or more processors enabling terminal aircraft sequencing and conflict resolution according to a method, the method comprising:

detecting an actual or potential violation of a minimum time separation between first and second aircraft, wherein the minimum time separation is greater than a difference between an estimated time of arrival (ETA) of the second aircraft and an ETA of the first aircraft at a common point;

calculating a required delay of the second aircraft, wherein the required delay is equal to the minimum time separation minus the difference between the estimated times of arrival of the first and second aircraft;

determining an achievable time control window of the second aircraft, wherein determining the achievable time control window comprises determining an earliest ETA and a latest ETA achievable by the second aircraft at the common point without modifying a lateral path of the second aircraft;

comparing the required delay to the achievable time control window of the second aircraft; and issuing one of a speed control advisory message, a lateral offset advisory message, and a manual controller intervention advisor message based on the comparison of the required delay and the achievable time control window of the second aircraft.

19. The computer program product of claim 18, wherein the method further comprises:

determining the ETA of the first aircraft and the ETA of the second aircraft using aircraft intent information.

20. The computer program product of claim 18, wherein determining the achievable time control window comprises determining the achievable time control window based on a defined required time of arrival (RTA) of the second aircraft.

21. The computer program product of claim 18, wherein the method further comprises:

if the required delay is greater than the achievable time control window of the second aircraft, determining if the second aircraft is capable of performing lateral offset maneuvers.

22. The computer program product of claim 21, wherein the method further comprises:

if the second aircraft is capable of performing lateral offset maneuvers, issuing the lateral offset advisory message to the second aircraft, the lateral offset advisory message including a time of arrival of the second aircraft at the common point equal to the ETA of the first aircraft plus the minimum time separation; and if the second aircraft is not capable of performing lateral offset maneuvers, issuing the manual controller intervention advisory message, the manual controller intervention advisory message advising manual intervention by an air traffic controller to resolve the detected actual or potential violation.

23. The computer program product of claim 22, wherein the method further comprises:

determining a magnitude of a lateral offset specified in the lateral offset advisory message based on the required delay using a look up table.

24. The computer program product of claim 23, wherein the lookup table includes a path stretch delay table configured to provide achievable time control windows using a plurality of path stretching methods based on the required delay and weather conditions.

25. The computer program product of claim 18, wherein the method further comprises:

if the required delay is less than the achievable time control window, determining if the second aircraft is capable of performing Required Time of Arrival (RTA) commands 26. The computer program product of claim 25, wherein the method further comprises:

if the second aircraft is capable of performing RTA commands, issuing the speed control advisory message in the form of an RTA command, the RTA command specifying a time of arrival of the second aircraft at the common point equal to the ETA of the first aircraft plus the minimum time separation; and if the second aircraft is not capable of performing RTA commands, issuing the speed control advisory message in the form of a timed speed command, the timed speed command including a speed Clearance and an issuance time for an air traffic controller to issue the command to the second aircraft.

* * * * *

UNITED STATES PATENT AND TRADEMARK OFFICE

CERTIFICATE OF CORRECTION

PATENT NO. : 8,775,062 B2
APPLICATION NO. : 13/287833
DATED : July 8, 2014
INVENTOR(S) : Becher et al.

It is certified that error appears in the above-identified patent and that said Letters Patent is hereby corrected as shown below:

In the Claims

In column 12, lines 45-46, claim 18, replace “a lateral path of the second aircraft” with --a lateral path of flight of the second aircraft--.

Signed and Sealed this
Twenty-first Day of October, 2014

Michelle K. Lee
*Deputy Director of the United States Patent and Trademark Office*